US008677378B2

(12) United States Patent
Murotake et al.

(10) Patent No.: US 8,677,378 B2
(45) Date of Patent: Mar. 18, 2014

(54) LIGHTWEIGHT, HIGH PERFORMANCE, REMOTE RECONFIGURABLE COMMUNICATIONS TERMINAL ARCHITECTURE

(75) Inventors: David K Murotake, Nashua, NH (US); Antonio Martin, Nashua, NH (US); Alden J Fuchs, Monument, CO (US)

(73) Assignee: Objective Interface Systems, Inc., Herndon, VA (US)

( * ) Notice: Subject to any disclaimer, the term of this patent is extended or adjusted under 35 U.S.C. 154(b) by 3659 days.

(21) Appl. No.: 10/991,254

(22) Filed: Nov. 17, 2004

(65) Prior Publication Data

US 2005/0108382 A1    May 19, 2005

Related U.S. Application Data

(60) Provisional application No. 60/520,778, filed on Nov. 17, 2003.

(51) Int. Cl.
*G06F 9/54* (2006.01)
*G06F 13/00* (2006.01)
*H04M 11/00* (2006.01)

(52) U.S. Cl.
USPC ........... 719/313; 719/315; 719/316; 455/403; 455/418

(58) Field of Classification Search
USPC ................... 719/313, 315–316; 455/403, 418
See application file for complete search history.

(56) References Cited

U.S. PATENT DOCUMENTS 7,530,074 B1 * 5/2009 Snodgrass ...................... 719/311
2008/0235712 A1 * 9/2008 Reed et al. ..................... 719/328

OTHER PUBLICATIONS

Bicer, Sabri Murat "A Software Communications Architecture Compliant Software Defined Radio Implementation", Northeastern University, Jun. 2002.*
"2003 Software Defined Radio Technical Conference and Product Exposition", SDR Forum, Feb. 2003.*
Yau, Stephen S. et al., "Reconfigurable Context-Sensitive Middleware for Pervasive Computing", IEEE, 2002, pp. 33-40.*
Alves-Foss, Jim et al. "A Multi-layered Approach to Security in High Assurance Systems", IEEE Proceedings of the 37th Hawaii Int'l Conference on System Science, 2004, pp. 1-10.
Murotake, David et al. "Performance Optimization of Remote SCA Launcher", pp. 1-5.
"SDR Forum Response to RFI: JTRS SCA and/or Non-secure (non Type-I) Non Tactical Software Defined Radios", Sep. 2003, pp. 3-11, SDR Forum, Document No. SDRF-03-I-0033-V1.0.
Murotake, David K., "Corporate Overview SCA for Space Applications", 2003, pp. 1-31, SCA Technica, Inc., Nashua, NH.

(Continued)

*Primary Examiner* — Qing Wu
(74) *Attorney, Agent, or Firm* — Venable LLP; Robert S. Babayi; Christopher B. Tokarczyk

(57) ABSTRACT

A software defined radio system having at least one radio core that has the ability to request or accept the delivery of a Reconfigurable Communications Architecture (RCA) compliant application(s), store the application(s), and has the minimum parts of the RCA framework necessary to run the application(s).

58 Claims, 8 Drawing Sheets

(56) References Cited

OTHER PUBLICATIONS

Murotake, David K. et al. "A Lightweight Software Communications Architecture (SCA) Launcher Implementation for Embedded Radios", pp. 1-5.

"SCA Lite Appendix", Aug. 15, 2003, pp. 1-25, SCA Technica, Inc. and Virginia Tech MPRG.

"Software Communications Architecture Specification", Nov. 17, 2001, p. 164, MSRC-5000SCA V2.2, Modular Software-programmable Radio Consortium.

Hayes, Neli, "Software Communications Architecture", OMG Workshop, Jul. 2003, pp. 1-229, The Boeing Company, Anaheim, CA, [online] [retrieved on Feb. 21, 2005] Retrieved from the internet <URL: http://www.omg.org/news/meetings/workshops/RT_2003_manual/tutorials/T2_SCA_Hayes.pdf.

* cited by examiner

LIGHTWEIGHT, HIGH PERFORMANCE, REMOTE RECONFIGURABLE COMMUNICATIONS TERMINAL ARCHITECTURE

RELATED APPLICATIONS

This application claims the benefit of U.S. Provisional Application No. 60/520,778, filed Nov. 17, 2003, which is herein incorporated in its entirety by reference.

FIELD OF THE INVENTION

The present invention relates to Reconfigurable Communications Architecture (RCA), and more particularly to lightweight RCA radio architecture.

BACKGROUND OF THE INVENTION

The Software Communications Architecture (SCA) evolved out of efforts to provide for communications across global and local platforms and the inability of the present designs to integrate with rapid technological developments. The Department of Defense formed the Joint Tactical Radio System (JTRS) program in order to investigate a modular and scalable platform for simplifying applications engineering and exploiting technology improvements. The JTRS revealed that the optimal platform to satisfy the assessed needs was a software controlled and reprogrammable infrastructure, commonly called a software defined radio (SDR). A consortium of radio manufacturers joined forces to define a standard for software architecture, namely the SCA, to support the JTRS requirements. Subsequently, the SCA was contributed by the JTRS to the Object Management Group (OMG), which developed and approved an international modeling standard for SDR communications terminals called SWRadio.

In general, SDRs are used to describe radios that provide software control and reconfiguration of a variety of modulation techniques, wide-band or narrow-band operation, communications security functions (such as hopping), and waveform requirements of current and evolving standards over a broad frequency range. The frequency bands covered may still be constrained at the front-end, given a particular antenna system.

There are various types and implementations of SDR architectures, such as modal SDR and reconfigurable SDR, depending upon the application. There are practical considerations related to cost, size, power, and weight to contend with in addition to the performance characteristics desired. A basic block diagram of the SDR functional blocks is shown in FIG. 7. In general, there are four functional areas that need to be addressed by the SDR: front end processing 100, information security 160, information processing 170, and control 150.

Conventional front end processing 100 refers to input/output (I/O) interface (antenna 140), RF processing (RF section 110), RF/IF up/down conversions (IF section 120), and conversion between digital and analog signals (ADC/DAC 130). Modulation/demodulation processing is considered part of the front end processing. For received signals, the analog IF signal is converted to digital samples that are then digitally processed in the baseband section by the processing engine 170. The information processing engine 170 is used for decomposing or recovering information signals containing data, control, and timing. Information security 160 is employed for the purpose of providing user privacy, authentication, and information protection. Content processing and I/O functions map into path selection (including bridging, routing, and gateway), multiplexing, source coding, signaling protocol, and I/O functions. The extracted information signals are then delivered to the appropriate function via a control interface 150 connection.

The SDR architecture is designed to support functions connected through open interfaces, and procedures for adding software specific tasks to each of the functional areas. The software applications for the open architecture include multiple subsystems interconnected by open interfaces, wherein the subsystems are determined by implementation considerations. Each subsystem typically contains any required hardware, resident firmware, an operating system, and software modules that may be common to more than one application. Interfaces link the software application to specific modules within each subsystem. The application layer tends to be modular, flexible, and software specific, with a common software API layer.

The functional interface of the SDR architecture has interfaces that are implementation dependent with data and information traffic exchanged between the functional blocks along the interfaces. The interfaces can be described as information and control oriented with control over each of the functional blocks. The information transfer, control, and status data is between the various functional blocks including the antenna 140, RF section 110, IF section 120, processing engine 170, security section 160, and control interface 150. As an example, the frequency at which a wireless signal is generated is determined at the RF section 110 and can be changed to accommodate different operating environments, such as moving between geographic regions with different frequency assignments.

A basic RCA specification is set forth in SCA Specification 2.2, which establishes the architecture definition and rule sets governing SCA compliant hardware and software elements. This specification is herein incorporated in its entirety by reference, including the various additions and amendments to the SCA framework. One known SCA implementation imposes processing and memory requirements that violate or otherwise prohibit the form factor and power consumption constraints placed on lightweight radio cores. As a result, trying to implement the full SCA 2.2 framework requires an extraordinary amount of overhead to build a radio that would run a compliant waveform or application. The end result is a much higher cost for the radio system, larger form factor than desired, increased weight and greater power requirements. For many applications this does not satisfy the end-user requirements, whether military or commercial.

One approach taken to solve this overhead problem is to make the SCA implementation "lighter" by removing functionality. However none of the extensive list of processes and their functions can be eliminated and still maintain SCA 2.2 compliance. Another approach includes remotely launching the waveform/application. By this means, a remote process (referred to as a launcher) is created that runs on a system separate from the SCA core framework. It accepts a compiled application and executes it. The application utilizes the Object Request Broker (ORB) and other parts of the SCA processes it needs over a bus like an Ethernet network. This saves considerable memory and processor requirements in the remote radio core as the only processes running on the radio core is the launcher and the applications. However, this particular SCA lite approach has several disadvantages.

All SDR process communication is handled by an ORB or other such middleware enabling system. As explained in the white paper, "A Lightweight Software Communications Architecture (SCA) Launcher Implementation for Embedded Radio" (which is herein incorporated in its entirety by reference), the ORB is designated to run on the host system only, external to a remote radio core running its part of the radio processes. This means the remote core running the remote processes must stay connected to an external system. One of the greatest issues facing this implementation is data passing performance, since all inter processes and application communication utilizes an ORB as defined by the SCA 2.2. If two or more processes running on the remote core wish to communicate with each other, they must utilize the ORB that resides on the master system. This results in high traffic flow between the two systems and high delays in passing data between local processes. This was not a consideration in the white paper design and is a detriment in many real world SCA systems.

Secondly, conventional lightweight SCA concepts do not address the minimal parts of the SCA framework necessary to support running applications on a remote core. This results in a much larger footprint in terms of storage space.

Another issue with conventional lightweight SCA is that the application launcher is a slave to the host. In particular, it has no means of triggering/initiating a request for an application.

Another issue with conventional lightweight SCA is that it does not address any means that a remote core could start the last running application after a remote core boots up.

What is needed, therefore, is a software defined radio framework and processes that comply with the demands of commercial and military end-user requirements.

SUMMARY OF THE INVENTION

One embodiment of the present invention provides a reconfigurable communications architecture (RCA) radio system. The system includes an Object Request Broker (ORB) process that is configured for enabling inter-process communication within the system. An Application Launcher process is configured for at least one of requesting, accepting, and starting RCA compliant applications via the ORB process. For instance, the Application Launcher process can be programmed to request only, or it can be programmed to accept only, or it can be programmed for both. A subset of a RCA core framework is configured to provide functionality that allows the compliant applications to operate. The architecture of the radio system may comply with, for example, the Software Communications Architecture (SCA) specifications (such as SCA 2.2 and 3.0), or the Object Management Group (OMG) SWRadio specifications.

The system has a number of applications that will be apparent in light of this disclosure, and can be realized, for instance, in a cellular phone, on a motherboard of a host as an integrated chip or chip set, in a wired or wireless modem, in a mobile computing chipset architecture such as INTEL CENTRINO, or on a plug and play (PnP) module (e.g., PCMCIA card or a USB module) adapted for coupling to a host (e.g., PC, PDA, laptop, cell phone, or other computing environment) via a plug and play bus.

The system can be implemented in one or more radio cores, and may further include a security device that encrypts data leaving a host system or Red radio core for broadcast over the air. Note that control messages, etc can be sent via a bypass. In one such particular case, the system includes a Red radio core in communication with the one or more Black radio cores through a security device (e.g., encryption or firewall). Here, the Red radio core may include a full RCA core framework capable of supporting the one or more Black radio cores, and can be adapted to communicate with a host via a plug and play bus. In another such particular case, the system includes a host in communication with the one or more Black radio cores through a security device. Here, the host may include a full RCA core framework capable of supporting the one or more Black radio cores. In one particular configuration, the system is a slave to a remote or external host that is configured with a full RCA core framework capable of supporting the system. The host may also be capable of building and sending applications and supporting information to the Application Launcher process.

The ORB process can be, for example, a full implementation of a CORBA ORB. Alternatively, the ORB process can be configured to provide a minimum functionality required for the processes and compliant applications, or as a Lightweight ORB. In one particular case, the ORB process is configured as a Multiple Independent Level of Security (MILS) CORBA ORB. The ORB process can be at least partially implemented using at least one of a Field Programmable Gate Array (FPGA), an Application-Specific Integrated Circuit (ASIC), a Digital Signal Processor (DSP), and a General Purpose Processing Unit (GPPU).

The system may further include an operating system for managing processes running on the system. The operating system can be, for example, one of a portable operating system interface (POSIX), minimal POSIX, or an Application Environment Profile (AEP) compliant kernel. In one particular configuration, the operating system is a MILS Partitioning Kernel. Furthermore, the operating system functionality may be incorporated into a processing unit such as a JAVA processing unit where the processor handles thread management and other kernel functionality. Further note that while reference is made herein to MILS, POSIX and other such operating system kernels, other possible operating systems could include, but are not limited to the various MICROSOFT WINDOWS operating systems (e.g., NT, 2000, XP, Embedded XP, CE), the various embedded and real-time distributions of LINUX, DOS, VXWORKS operating systems, and others.

The RCA core framework can be configured, for example, to support functionality for at least one of an Application Factory, a Resource Factory, an Application, Resources, a Device, a Property Set, a Port, a Port Supplier, and a Testable Object. The subset of the RCA core framework may further support functionality for at least one of a Loadable Device, an Executable Device, and an Aggregate Device. The system may further include a Device Manager process for managing devices supported by the subset of the RCA core framework. The subset of the RCA core framework can be at least partially implemented using at least one of, for example, an FPGA, an ASIC, a DSP, and a GPPU.

The Application Launcher process can be further configured to accept, store, and start at least one RCA compliant waveform. The Application Launcher process can also be configured to respond to requests from a host, and/or to request at least one waveform from a host. The Application Launcher process may also be configured to, on boot, start a last known waveform (or otherwise return to the last known operating state after rebooting). For instance, the Application Launcher can be implemented on an FPGA's hard or soft core GPPU. It would be capable of accepting and storing waveforms that run on either the GPPU, to reprogram the FPGA or a waveform that runs on both the FPGA and GPPU. The Application Launcher process can be at least partially implemented using at least one of, for example, an FPGA, an ASIC, a DSP, and a GPPU.

Another embodiment of the present invention provides a lightweight reconfigurable communications architecture (RCA) radio system. The system includes a MILS CORBA ORB process that is configured for enabling inter-process communication within the system, and an Application Launcher process that is configured for requesting and accepting RCA compliant applications via the MILS CORBA ORB process. A MILS Partitioning Kernel is configured to allow high security applications to operate in the system, and a subset of a RCA core framework is configured to provide functionality that allows the compliant applications to operate. The MILS Partitioning Kernel can be further configured for managing processes (e.g., such as an ORB process and Application Launcher processes) running on the system.

The system can be implemented in one or more radio cores, and may further include a security device that performs encryption service (or other security service) on data passing to and from the one or more radio cores. For example, the system may include a host or Red radio core in communication with one or more Black radio cores through a security device. In one such configuration, the host/Red radio core includes a full RCA core framework capable of supporting the one or more Black radio cores. The system can also be implemented in one or more Red radio cores (as opposed to Black radio cores). In any case, the system can be a slave to a remote or external host configured with a full RCA core framework capable of supporting the system, and may be capable of building and sending applications and supporting information to the Application Launcher process.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
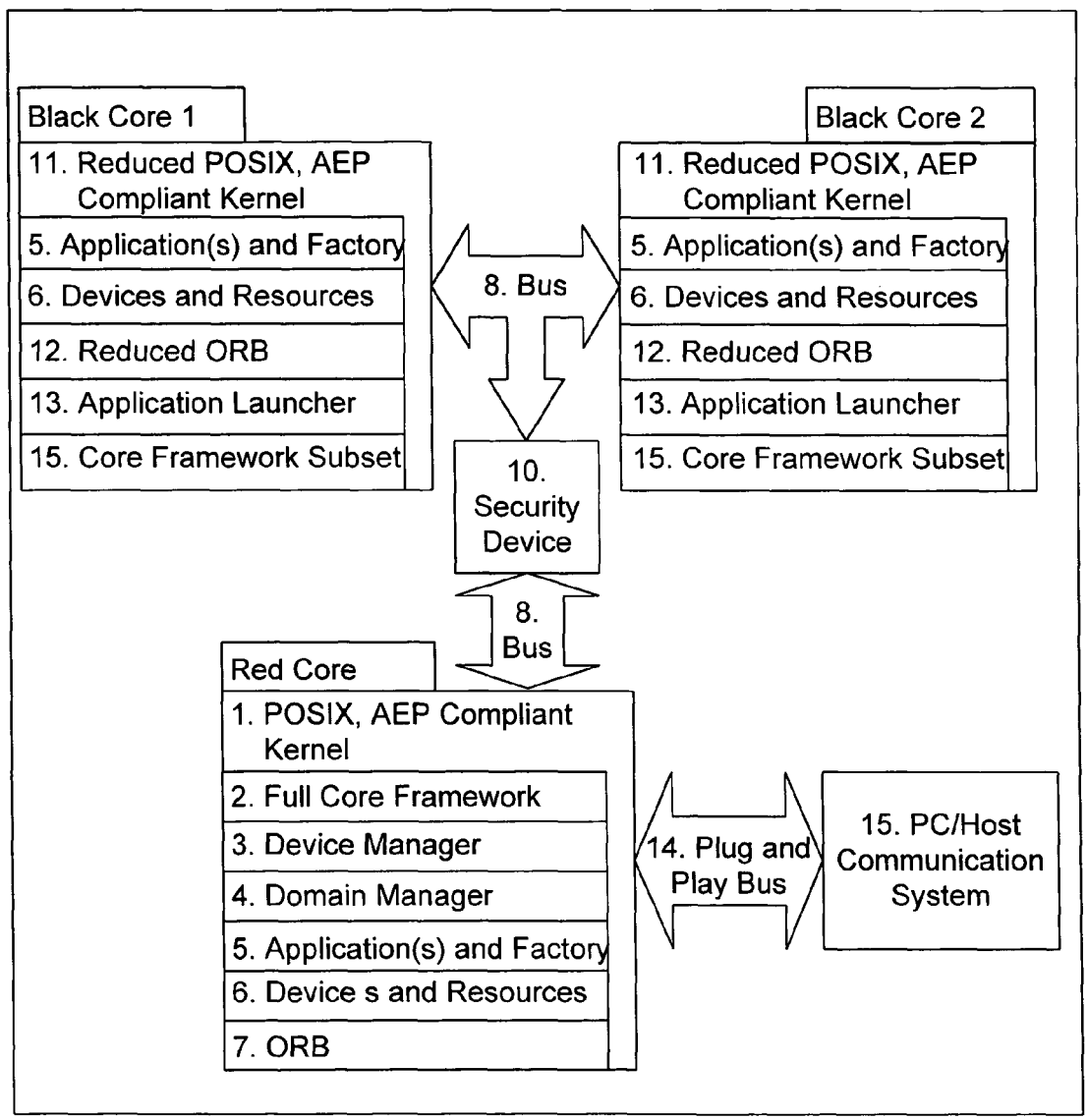
FIG. 1 is a block diagram of a host, processes and functionality running on two Black radio cores and a Red radio core, and the inter-relationship of the processes, in accordance with an embodiment of the present invention.

Embodiments of the present invention provide a software defined radio framework and processes that comply with the demands of the commercial and military end-user requirements. A software defined radio (SDR) system is provided that incorporates a minimum number of elements for RCA waveform compliance, yet provides the framework and processes to efficiently run the desired applications. While embodiments of the invention are described herein with reference to a Reconfigurable Communications Architecture (RCA) based on the Software Communications Architecture (SCA) 3.0 specification, the present invention is not intended to be limited to this specification. Rather, it will be apparent in light of this disclosure that the principles of the present invention may also be applied to other RCAs including but not limited to SCA 2.2 and the OMG's SWRadio specification.

Overview

An SDR is a radio whose channel modulation waveforms are defined in the software. Waveforms for transmission are generated as sampled digital signals, converted from digital to analog via a wideband digital to analog converter (DAC) and optionally upconverted from an intermediate frequency (IF) to a radio frequency (RF). For reception of signals, the receiver extracts, downconverts and demodulates the channel waveform. A wideband analog to digital converter (ADC) converts the received signals to digital for subsequent processing at the software radio node. By employing common hardware elements and implementing design changes via the software, the end-user obtains a seamless transition between various waveforms, protocols and bug fixes, and the life cycle of the device is greatly enhanced.

SDR technology is applicable across a wide range of areas within the wireless industry that provides efficient and comparatively inexpensive solutions to several constraints posed in current systems. For example, SDR-enabled user devices and network equipment can be dynamically programmed in software to reconfigure their characteristics for better performance, richer feature sets, advanced new services that provide choices to the end-user and new revenue streams for the service provider. SDR is uniquely suited to address the common requirements for communications in the military, civil and commercial sectors.

One radio system configured in accordance with an embodiment of the present invention is made up of one or more radio cores with functioning processes deployed therein. The radio system could be embodied, for example, in a PCMCIA card or a USB device that plugs into a PC. The radio system could also represent the processing systems for a cell phone, where the applications are the processes that define the waveform as well as the functionality and interfaces to the keypad, display, microphone, speaker, and more. The radio system could also be a radio system that plugs into military equipment, such as a helicopter or other vehicle. Many other radio system applications are possible here, as will be apparent in light of this disclosure.

While some parts of the SDR framework can run on the radio system, it need not be the entirety of the RCA framework or other SDR framework. Rather, just the minimal parts or abstractions of the functionality can be used to allow a compliant waveform/application to operate. This could also include partial (smaller) implementations of the various RCA framework pieces. Furthermore, these parts could run separate from a full or even partial implementation of the RCA Framework. The following minimal system description is designed to place the smallest possible footprint inside of the operating radio while balancing performance, flexibility, while allowing the necessary, heavier portions to exist on another more robust part of the embedded radio or host system.

Example Minimal Frameworks

The framework may include an Application Factory, Resource Factory, Application, Resource, Device, Loadable Device, Executable Device, Aggregate Device, Property Set, Port, Port Supplier, Testable Object or an abstraction of such that can either already exist in the radio core or can be downloaded with the application to provide the means of supporting an application instance and other functionality as defined by the RCA.

One possible minimal framework would support Application Factory, Resource Factory, Application, Resources, Device, Loadable Device, Executable Device, Aggregate Device, Property Set, Port, Port Supplier, Testable Object or an abstraction of such that can either already exist in the radio core or can be downloaded with the application to provide the means of initiating an application instance and other functionality as defined by the RCA specification.

Yet another possible minimal framework would support Application Factory, Resource Factory, Application, Resources, Device, Loadable Device, Property Set, Port, Port Supplier, Testable Object or an abstraction of such that can either already exist in the radio core or can be downloaded with the application to provide the means of initiating an application instance and other functionality as defined by the RCA specification.

The minimum part of a functioning system may include an Object Request Broker (ORB) or other middleware enabling system as required by the definition of the RCA. It can be, for example, a full implementation of a CORBA ORB, or it could be a specialized minimal ORB providing just the minimum necessary functionality for the radio core processes and applications. Other middleware enabling systems will be apparent in light of this disclosure, and the present invention is not intended to be limited to any particular one.

A further minimum part of the operating system may include a portable operating system interface (POSIX) compliant kernel (or other suitable operating system or kernel). The level of POSIX compliance is defined by the various annexes of the SCA or the requirements for the SDR system.

The minimal system may include a Device Manager or abstraction of such that can either already exist in the radio core or can be downloaded with the application to provide the means of managing devices and other functionality as defined by the RCA.

In one embodiment of the present invention, the minimal embedded system includes an Application Launcher that is responsible for managing the applications. Such management includes, for example, accepting or requesting and receiving an application and supporting files, such as applications, devices, resources, FPGA bit streams, boot order and assembly description/instructions, from a system remote to the core, storing applications and files and abstractions (e.g., in flash memory, FPGA gates, or other storage medium).

The Application Launcher, on boot, could attempt to connect to the host system. If it is unable to find the host, it could execute/start the previous running application (or otherwise return to the last known operating state after rebooting). If it can find the host, it can request an application to run. The host system would send the required application over to the Launcher.

In reference to an SCA 3.0 implementation, a possible minimal framework and system implemented in the embedded radio could eliminate the Domain Manager, File Manager, File System, File and possibly other functionality, allowing for the host or master system to run said services or provide said functionality that can be referenced by the smaller and lighter embedded radio subsystems.

Another possible minimal framework and system implemented in the embedded radio could further eliminate the Device Manager, Aggregate Device, Executable Device and or Loadable Device, thus allowing for the host or master system to run these services or provide said functionality that can be referenced by the smaller and lighter embedded radio subsystems.

Alternatively, the various functionalities could be implemented in the radio core as a single process, multiple processes, or part of the operating system. The functionality could be fully or partially embedded in an FPGA, DSP, or ASIC logic. The functionality could also be implemented using any combination of the preceding, or any other suitable processing environment.

Furthermore, while the main system functionality could reside on a softcore or hardcore general purpose processing unit (GPPU), portions of the system could be implemented inside of an FPGA or other such hardware device in either the minimal system or host. This would have two benefits.

First, a portion of the ORB could be implemented in an FPGA or other such hardware device. This would help to accelerate the performance of the ORB and reduce the memory footprint running in the GPPU. Such a portion of the ORB to consider for hardware acceleration would be the ORB's marshalling functionality. This hardware acceleration could further be used for other such running processes or portions of the core framework. Implementing the core framework API, or portions of said API, could help with system performance.

Secondly, processes like the Application Launcher could have portions of their functionality implemented inside of an FPGA or other such hardware device. This would help protect the SDR from intrusion attacks as the functionality of the application would be embedded in gates or silicon verses more easily writable flash or system memory. Such an example would be the security functionality in the Application Launcher that allows it only to accept new applications from trusted sources. In protecting that portion from being corrupted, the SDR becomes more secure from hackers trying to create exploitable openings. Further, another such possible place for protection would be the radio file access to prevent the Application Launcher from being changed so that it can overwrite and possibly corrupt information critical for system operation. These two examples are not all inclusive, nor is the Application Launcher the only portion of the system that needs such protection. Critical boot and operational information, for instance, would also benefit from such protection as would many other portions of the system.

Radio System Architectures

FIG. 1 is a block diagram of a host, processes and functionality running on two Black radio cores and a Red radio core, and the inter-relationship of the processes, in accordance with an embodiment of the present invention.

This two channel radio (by virtue of the two Black radio cores) employs a security device 10 to separate the Black radio cores from the Red radio core. The security device 10 is responsible for encrypting or decrypting data, and can be implemented with conventional technology (e.g., encryption chip). Note that the Black radio cores are completely separated from the rest of the system by the security chip. By this means, there is no way that unencrypted, clear data or signals can be sent over the air by the radio system. Note that control messages, etc can be sent via a bypass that is not subjected to encryption or other security measures.

Bus 8 (e.g., Ethernet network or other suitable bus structure) enables communication between the two Black cores, as well as between each of the Black cores and the Red core, via the security device 10. A plug and play bus 14 (e.g., PCMCIA or other plug and play bus structure) couples each of the Black and Red radio cores (via the Red core) to a PC/Host Communication System.

In this configuration, the Red radio core acts as a master with the heavier SDR framework and support processing for the smaller embedded Black cores. In particular, the more robust Red Core includes a Full Core Framework 2 needed to support the SDR, as well as running processes like the ORB 7 (e.g., CORBA ORB), the Domain Manager 4, and the Device Manager 3 needed by the portable operating system interface (POSIX) or Application Environment Profile (AEP) Compliant Kernel 1. Other such features necessary and needed to run an RCA or other SDR system can also be included, depending on the desired functionality.

Each of the Black cores 1 and 2 employ an Application Launcher 13 and a Reduced ORB 12. The Reduced ORBs 12 can communicate with each other, as well as with the Red core's ORB 7. In addition, each of the Black cores has a Reduced POSIX or AEP Compliant Kernel 11, a number of Applications and Factory 5 (e.g., Application Factory and Resource Factory), Devices and Resources 6, and a Core Framework Subset 15 (e.g., Port, Port Supplier, Life Cycle, Device Manager and Property Set). Note that Applications/Factory 5 and Devices/Resources 6 could also be included in the Core Framework Subset 15.

This configuration allows a higher processing capable Red radio core to host the waveform definitions and data, to read and parse the definitions describing the waveforms, and to build the appropriate devices, resources and applications. The Red radio core can also start the needed application functionality on its side and then send, via the ORB communication, the files and other supporting information to the respective Application Launchers 13 of the Black cores, thereby enabling the Application Launchers to start Black core portions of the waveform.

The Domain Manager 4 of the Red core then reads, for example, the SAD XML files (as designated in the SCA 3.0 spec) and, via ORB communication, connects and starts the various running processes so that the SDR system can operate. It is the interlinked Reduced ORBs 12 (of the Black cores) and ORB 7 (of the Red core) in the system that allow for a seamless communication. Furthermore, since each Black core has its own Reduced ORB 12, each Black core can gain the benefits of inter-process communication happening locally. Also, the smaller size of Core Framework Subsets 15 residing on the Black cores reduces flash and memory requirements, relative to a fully implemented Full Core Framework 2.

This radio system could be, for example, a plug and play card of a PC/Host System where the radio functionality could be, for example, a variant of 802.11 or some military waveform. In such an embodiment, the plug and play card (which would include the Black and Red cores and the security device 10) connects to the PC/Host System via the plug and play bus 14, which can be represented, for instance, by PCMCIA or other such PC bus connections.

Figure 2:
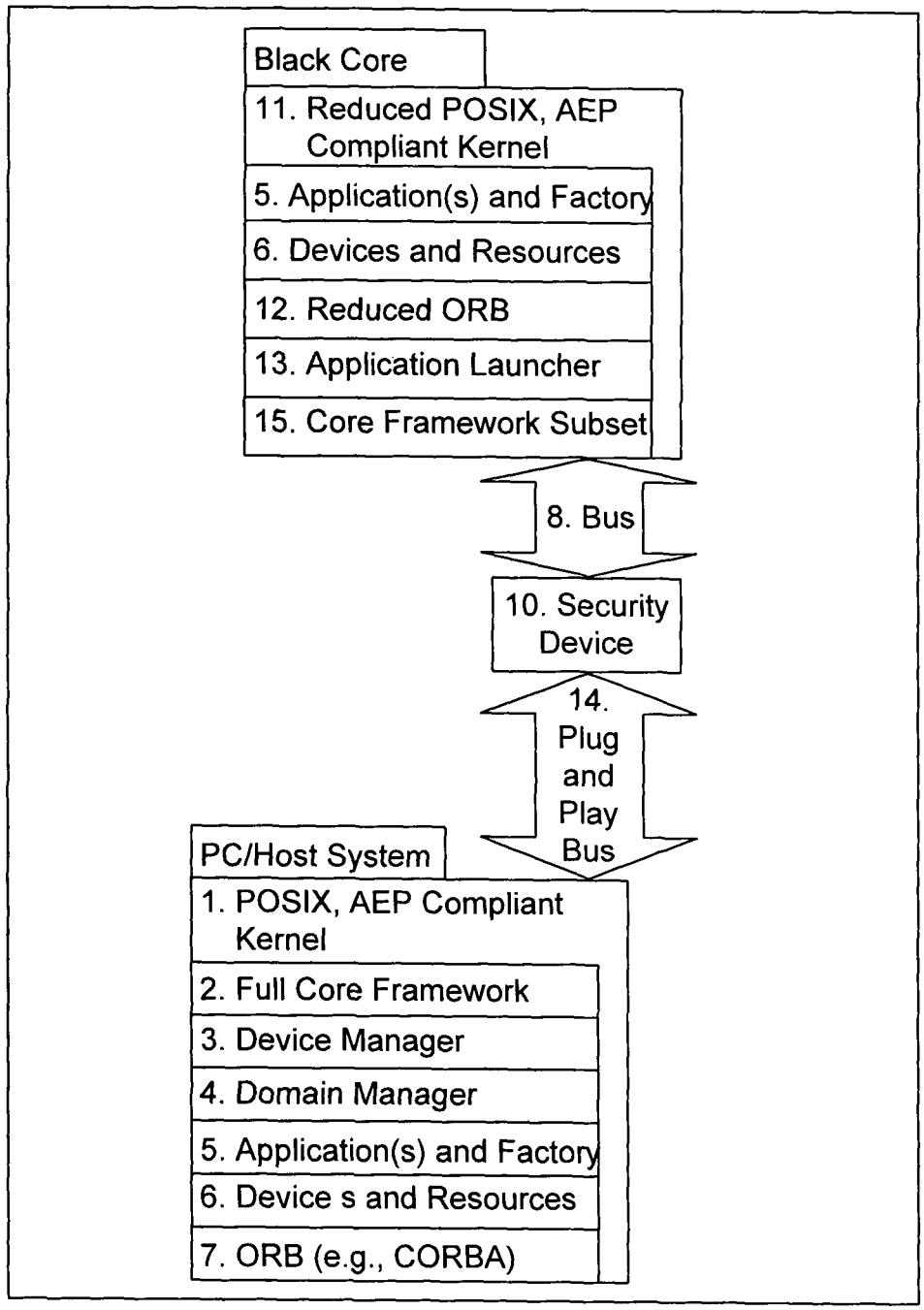
FIG. 2 is a block diagram of a host, processes and functionality running on a single radio core, and the inter-relationship of the processes, in accordance with an embodiment of the present invention.

FIG. 2 is a block diagram of a host, processes and functionality running on a single radio core, and the inter-relationship of the processes, in accordance with an embodiment of the present invention. As can be seen, a Black radio core and a PC/Host System are separated by a Security Device 10. Bus 8 operatively couples the Black core to the Security Device 10, while a plug and play bus 14 operatively couples the PC/Host System to the Security Device 10. In this configuration, all Red side radio processing occurs on the PC/Host System, while all Black side processing occurs on the separated Black Core.

The PC/Host System, effectively acting as the Red side of the radio, hosts the Full Core Framework 2 needed to support the SDR and running processes, like the ORB 7 (e.g., CORBA ORB), the Domain Manager 4, and the Device Manager 3 needed by the POSIX or AEP Compliant Kernel 1, and other such features necessary and needed to run an RCA or higher compliant system.

The Black core of this configuration employs an Application Launcher 13, a Reduced ORB 12 that is connected to and can communicate with the ORB 7 of the PC/Host System, a Reduced POSIX or AEP Compliant Kernel 11, and a Core Framework Subset 15 (e.g., Device, Resource, Resource Factory, Application, Application Factory, Port, Port Supplier, Life Cycle, Device Manager and Property Set). Note that the Applications/Factory 5 and the Devices and Resources 6 are shown separately, but can be included in the Core Framework Subset 15.

Such a configuration allows the host to take the waveforms, read and parse their XML files describing their functionality, build the appropriate devices, resources and applications, start the needed application functionality on the Red PC/Host System, and then send (via the ORB communication) the files and other supporting information to the Application Launcher 13 of the Black core so that the Black core can start its portion of the waveform.

The Domain Manager 4 then connects (via ORB communication) the various running processes so that the radio system can operate. The interlinked Reduced ORB 12 (of the Black core) and ORB 7 (of the PC/Host System) in the radio system allows for seamless communication. Also, because the Black core has its own Reduced ORB 12, which is specialized for Black core processing needs, the Black core can gain the benefits of inter-process communication happening locally, instead of routing to the remote ORB 7. In addition, the smaller size of Core Framework Subset 15 residing on the system reduces flash and memory requirements, as compared to a fully implemented Full Core Framework 2.

This radio system could be, for example, a plug and play card of a PC/Host system where the radio functionality could be, for example, a variant of 802.11 or some military waveform. In such an embodiment, the plug and play card (which would include the Black core and the security device 10) connects to the PC/Host System via the plug and play bus 14, which can be represented, for instance, by PCMCIA or other such PC bus connections. In such an embodiment, note that when the plug and play card is plugged into the PC/Host System, the radio system would boot up its Reduced POSIX or AEP Compliant Kernel 11, Reduced ORB 12, and Application Launcher 13. The radio system would then inform the PC/Host System that it is booted and in a ready/waiting state. The PC/Host System, with its full core frame work implementation, will then start the waveform by compiling the needed waveforms, downloading those waveforms to the radio system, and starting needed processes both on the PC/Host System and the remote radio system. Furthermore, when the radio system boots, it could inform the PC/Host System of what waveform parts it currently has stored in flash or on a FPGA, thereby allowing the PC/Host System's complete SCA framework to only download and reconfigure the parts of the waveform not available.

Figure 3:
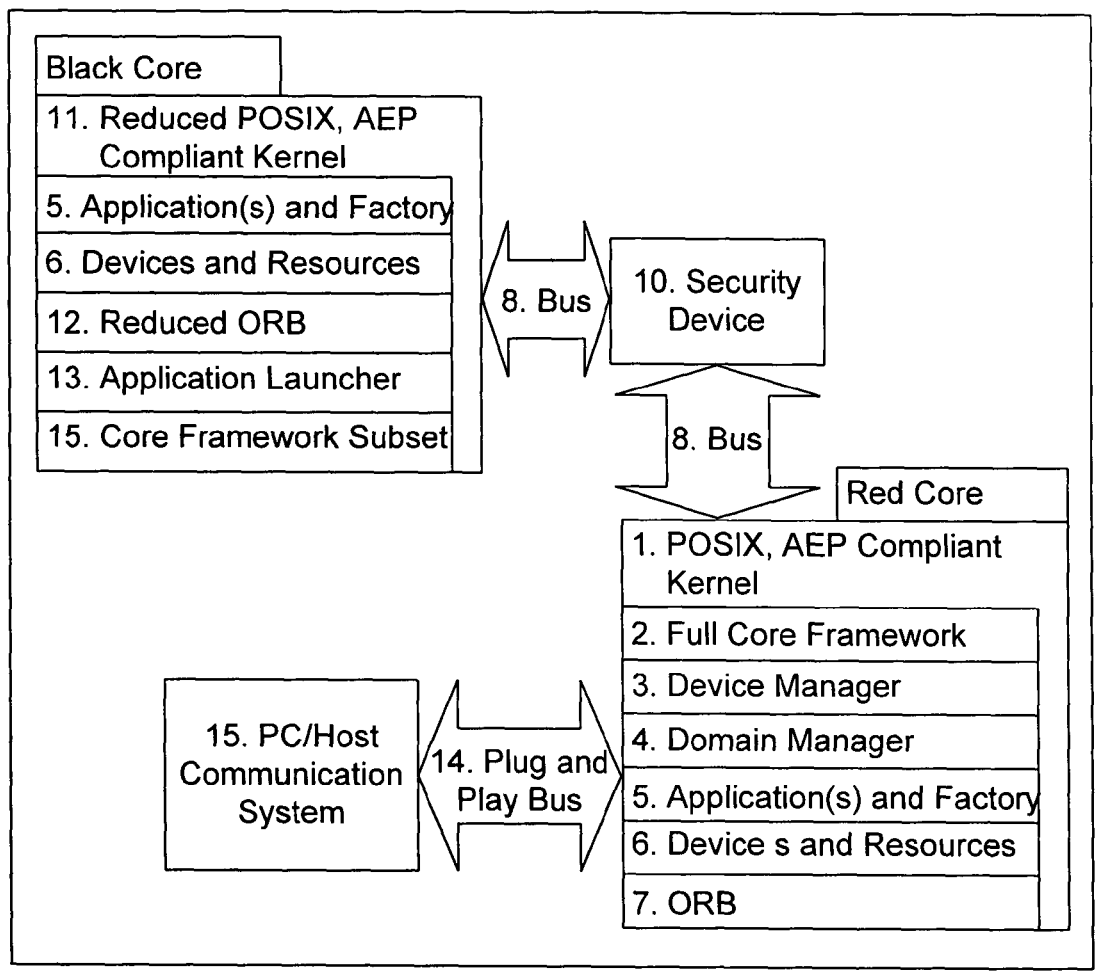
FIG. 3 is a block diagram of processes and functionality running on a single Black radio core and a Red radio core, and the inter-relationship of the processes, in accordance with an embodiment of the present invention.

FIG. 3 is a block diagram of a host, processes and functionality running on a single Black radio core and a Red radio core, and the inter-relationship of the processes, in accordance with an embodiment of the present invention. Here, a single channel radio is shown, with the Black radio core separated from the Red radio core by a Security Device 10. This radio system is connected to the PC/Host Communication System by means of the plug and play bus 14 (e.g., PCMCIA or other suitable bus structure), and would function similarly to the system shown in FIG. 1, but is an example of a single channel (one Black core) radio system.

Figure 4:
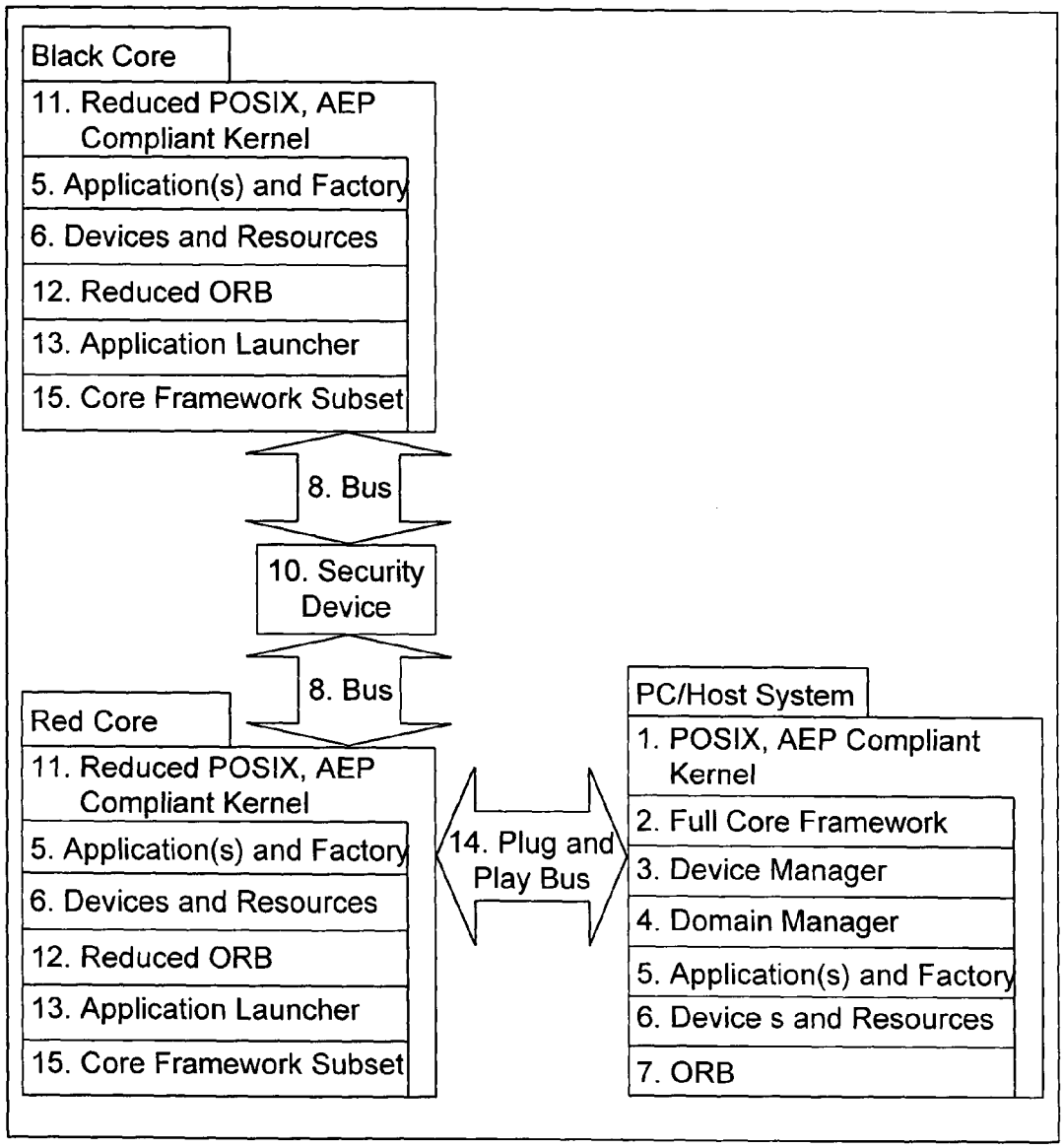
FIG. 4 is a block diagram of a host, processes and functionality running on a single Black radio core and a Red radio core, and the inter-relationship of the processes, in accordance with another embodiment of the present invention.

FIG. 4 is a block diagram of a host, processes and functionality running on a single Black radio core and a Red radio core, and the inter-relationship of the processes, in accordance with another embodiment of the present invention. This is another example of a single channel radio system, where the Black radio core is separated from the Red radio core by a Security Device 10. This radio system is connected to a PC/Host System by means of a plug and play bus 14 (e.g., PCMCIA).

In this particular configuration, each of the Red and Black radio cores carry a light weight communications architecture, while the full SCA system resides on the PC/Host System, which includes a Full Core Framework 2 needed to support the SDR, as well as running processes like the ORB 7 (e.g., CORBA ORB), the Domain Manager 4, and the Device Manager 3 needed by the POSIX or AEP Compliant Kernel 1. Other such features necessary and needed to run PC/Host System can also be included, depending on the desired functionality. This allows the radio system as a whole to leverage the resources on the PC/Host System for the heavier footprint and possibly processing functionality, while the remote Black and Red radio cores only host the minimal parts necessary for the applications to run efficiently.

Figure 5:
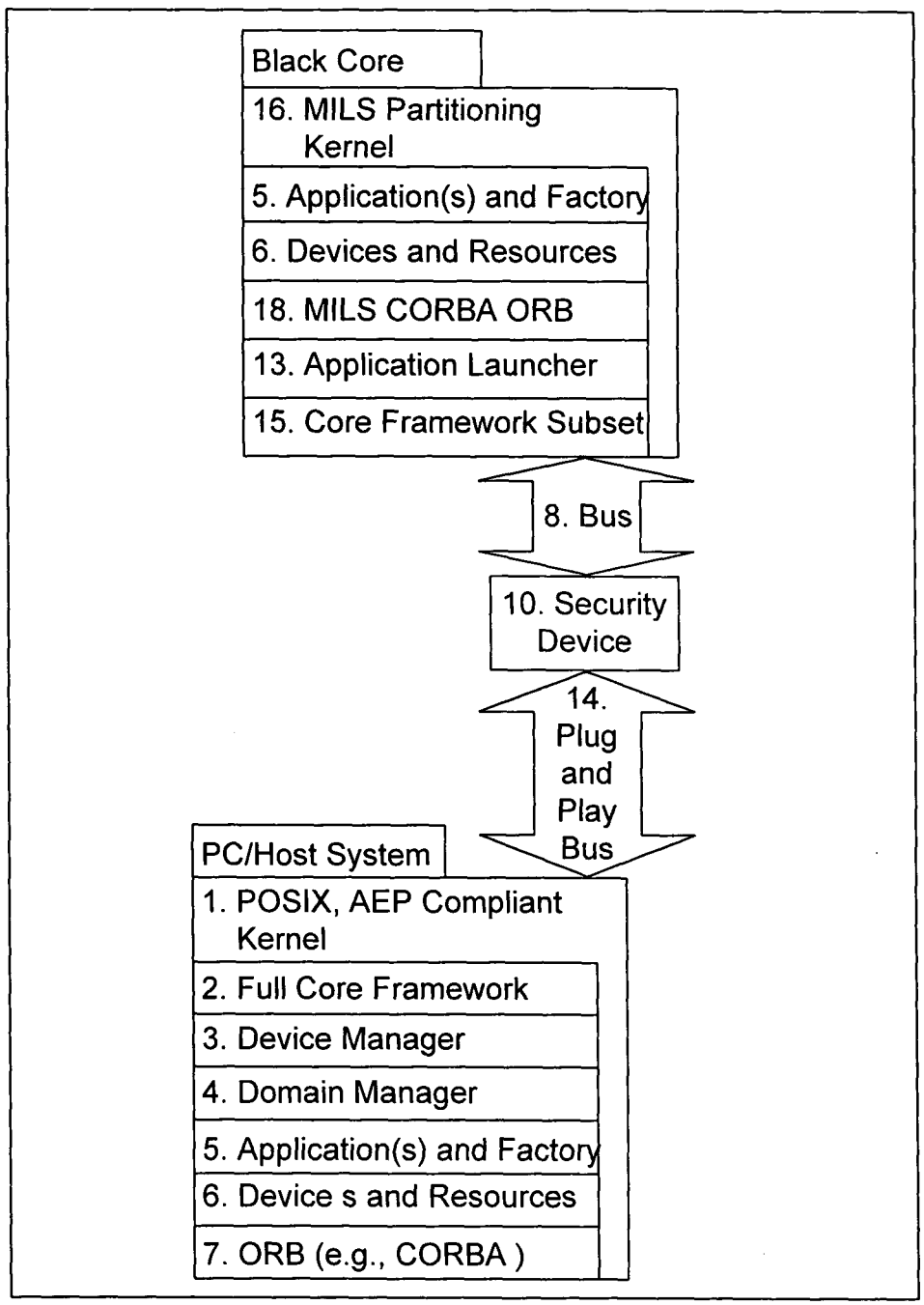
FIG. 5 is a block diagram of a host, processes and functionality running on a single radio core in a MILS architecture, and the inter-relationship of the processes, in accordance with an embodiment of the present invention.

FIG. 5 is a block diagram of a host, processes and functionality running on a single radio core in a MILS architecture, and the inter-relationship of the processes, in accordance with an embodiment of the present invention. As can be seen, a Black radio core and a PC/Host System are separated by a Security Device 10. All Red side radio processing effectively occurs on the PC/Host System, while all Black side processing occurs on the separated Black core.

The PC/Host System, acting as the Red side of the radio system, hosts the Full Core Framework 2 needed to support the software defined radio and running processes like the ORB 7 (e.g., CORBA), the Domain Manager 4, and the Device Manager 3 needed by the POSIX or AEP Compliant Kernel 1, and other such features necessary and needed to run an RCA system.

The Black core employs an Application Launcher 13, an MILS (Multiple Independent Level of Security) CORBA ORB 18 that is connected to and can communicate with the ORB 7, a MILS Partitioning Kernel 16, and a Core Framework Subset 15 (e.g., Device, Resource, Resource Factory, Application, Application Factory, Port, Port Supplier, Life Cycle, Device Manager and Property Set). Note that the Applications/Factory 5 and the Devices and Resources 6 are shown separately, but can be included in the Core Framework Subset 15.

This particular configuration allows the host to take the waveforms, read and parse their XML files describing their functionality, build the appropriate devices, resources and applications, and start the needed application functionality on the Red/PC/Host side. The host can then send, via the ORB communication, the files and other supporting information to the Application Launcher 13 of the Black core, so the Black core can start its portion of the waveform.

The Domain Manager 4 of the PC/Host System then reads the SAD XML files and, via ORB communication, connects the various running processes so that the radio can operate. It is the interlinked MILS CORBA ORB 18 (of the Black core) and ORB 7 (of the PC/Host System) in the system that allow for a seamless communication. Furthermore, since the Black core has its own MILS CORBA ORB 18, specialized for its processing needs, the Black core can gain the benefits of inter-process communication happening locally instead of routing to the remote ORB 7. Also, the smaller size of Core Framework Subsets 15 residing on the Black core reduces flash and memory requirements, relative to a fully implemented Full Core Framework 2.

This radio system could be, for example, a plug and play card of a PC/Host System where the radio functionality could be, for example, a variant of 802.11 or some military waveform. The MILS CORBA ORB 18 and MILS Partitioning Kernel 16 are utilized to allow for high security applications to operate in the radio environment. Note that this MILS architecture could also run on a Red core.

Methodology

Figure 6A:
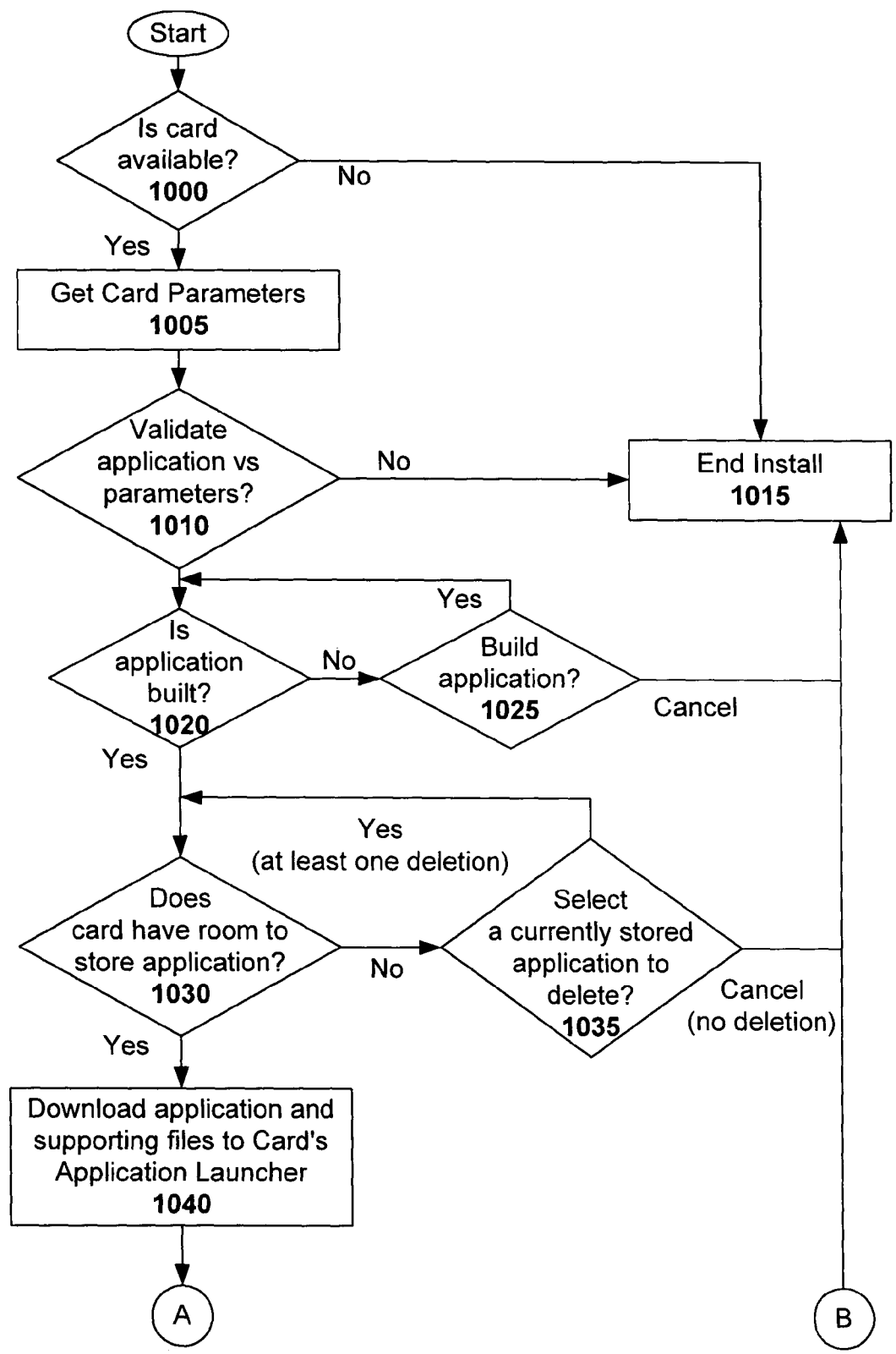
FIGS. 6a and 6b illustrate a flow chart of a method for installing/downloading and starting a new application on a PCMCIA card plugged into a PC, in accordance with an embodiment of the present invention.
Figure 6B:
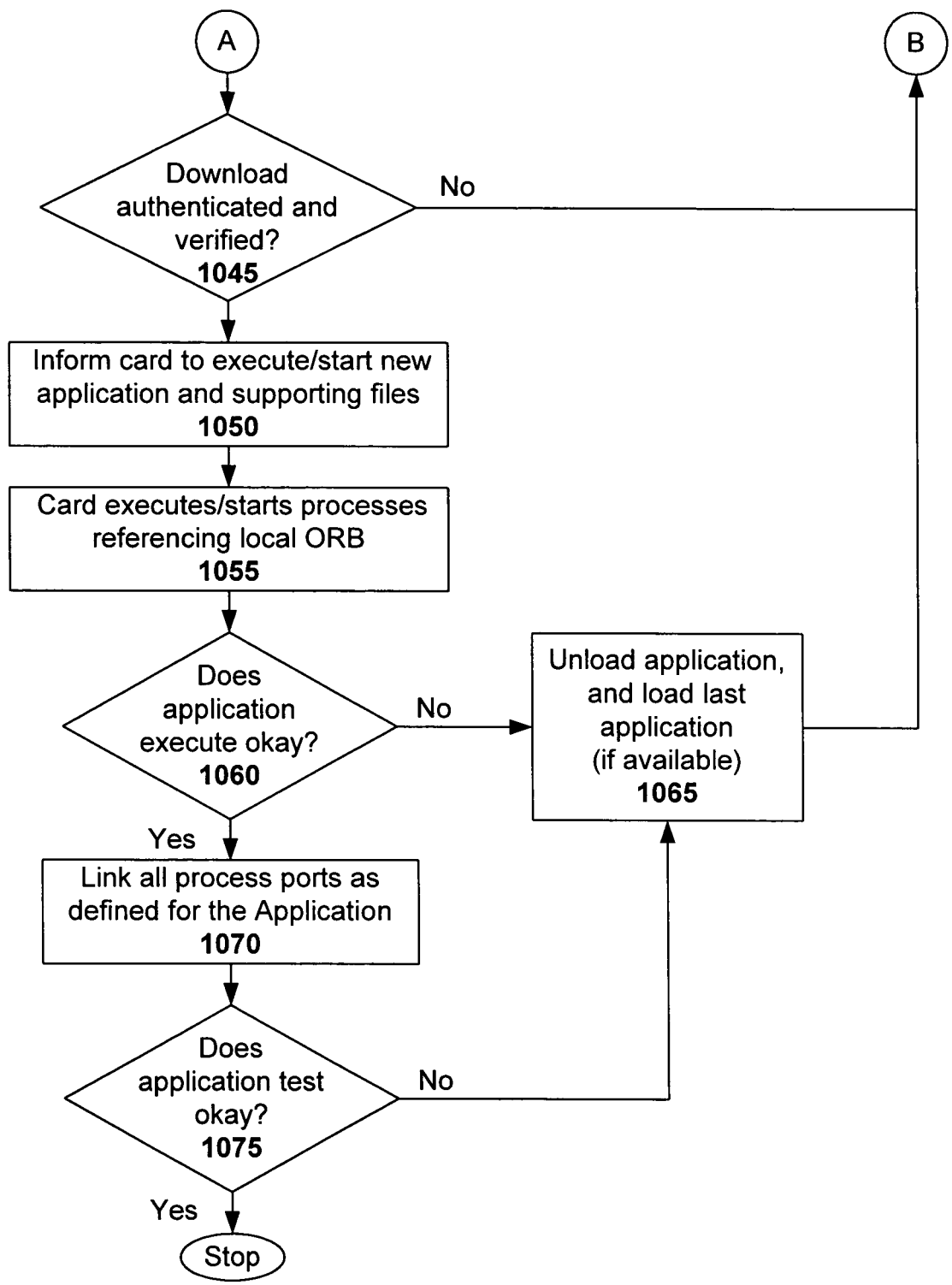
Figure 7:
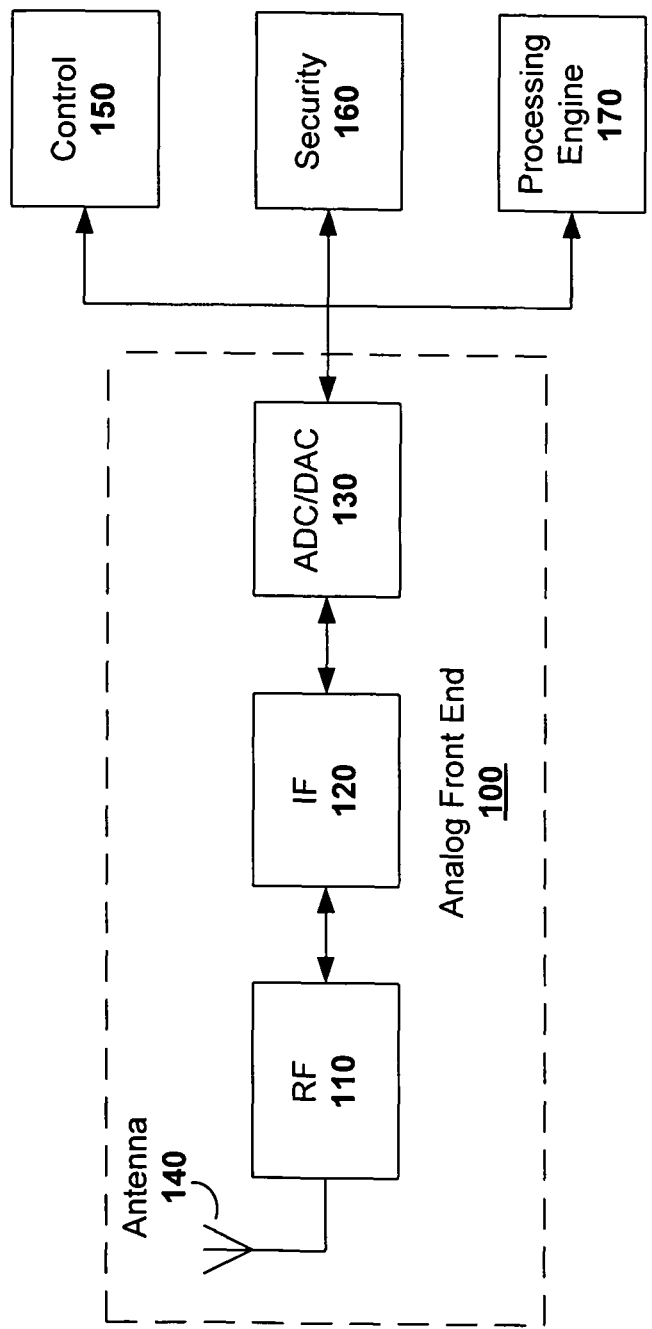
FIG. 7 is a block diagram of the basic building blocks of an SDR architecture.

FIGS. 6a and 6b illustrate a flow chart of a method for installing/downloading and starting a new application on a PCMCIA card plugged into a PC (or other processing environment), in accordance with an embodiment of the present invention.

Once an operation is invoked to install or download a new application, the method begins with the host system determining 1000 if the card is available (e.g., by performing a status inquiry on the PCMCIA card). This is a standard operating system check. If the card is offline or not available, the method proceeds with ending 1015 the installation.

If the card is available and working, the full SCA system on the host system continues with retrieving 1005 the card parameters. The host system continues with determining 1010 if the application and the card parameters are valid with respect to one another (i.e., determine if the card can accommodate the application). If the parameters and application are not validated, the host system proceeds with ending 1015 the installation. If the parameters and application are validated, then the host system continues with determining 1020 if it must rebuild the application locally or if it already has the binaries and supporting files available. If the application is not yet built, then the host system proceeds with building 1025 the application. Note that if the building process cannot be successfully completed or is cancelled, then the host system proceeds with ending 1015 the installation.

If the application is built, then the host system continues with determining 1030 if the card has room to store the application. If the card does not have sufficient memory to accommodate the application, the host system proceeds with determining 1035 if any of the currently stored applications can be deleted to free up memory space by asking the Application Launcher. If not, then the host system proceeds with ending 1015 the installation. If at least one application can be (and is) deleted, then the host system repeats the determining at step 1030.

Assuming the card has sufficient memory to accommodate the application, the host system continues with downloading 1040 the application to the Application Launcher of card, along with the required support files if necessary. The Application Launcher then stores the files that are sent, and then attempts to authenticate the download and verify the integrity of the download and supporting files and executes the processes. The host system proceeds with determining 1045 if the download is authenticated and verified. If not, then the host system proceeds with ending 1015 the installation. If the download is authenticated and verified, then the host system proceeds informing 1050 the Application Launcher of the remote radio core to execute the needed processes. The Application Launcher then continues with executing 1055 the processes, pointing them to utilize the local ORB.

The host system then continues with determining 1060 if the application successfully executes. If the application is successfully executed, then the host system proceeds with linking/connecting 1070 the various application ports as defined for the application. Next the host system continues with performing an application test, and determining 1075 if the application test is positive (i.e., no failure). If so, then the application installation process is completed. If either of the execution of step 1060 or the testing of step 1075 is unsuccessful, the host system proceeds with unloading 1065 the application, and loading previous application (if available). The host system proceeds with ending 1015 the installation.

Thus, an embodiment of the present invention has the ability to accept SCA applications within a radio core. The radio core is configured to store and execute the applications. Also, the radio core(s) has embedded therein the minimum functionality of the SCA so that the applications can operate on their own, thus increasing overall performance. This includes the ORB embedded in the core(s), whether reduced or a full ORB.

Note that a radio system configured in accordance with the principles of the present invention can be integrated, for example, into any one of a wireless modem, a wired modem, a USB module, a plug-and-play PC card module, a PCI card module or other bus structures (e.g., shared processor bus and switched fabric). Likewise, the radio system could be integrated into a motherboard of a host as an integrated chip or chip set. This architectural approach for a SDR may also be built into existing mobile computing chipset architectures such as INTEL CENTRINO.

It should be obvious that these designs can be applied to systems beyond radios and can be utilized in any place where an SCA type of implementation is utilized and can leverage the networking characteristics where connected subsystems need not run the entirety of the framework, parsing and other support mechanisms.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A lightweight reconfigurable communications architecture (RCA) radio system, comprising:
    at least one processor for executing processes running on the system;
    an operating system for managing said processes running on the system;
    an Object Request Broker (ORB) process configured for enabling communication of messages between two processes;
    an Application Launcher process configured for at least one of requesting and accepting RCA compliant applications via the ORB process; and
    a subset of a RCA core framework configured to provide functionality that allows the compliant applications to operate.

2. The system of claim 1 wherein the ORB process is a full implementation of a CORBA ORB.

3. The system of claim 1 wherein the ORB process is configured to provide a minimum functionality required for the processes and compliant applications.

4. The system of claim 1 wherein the ORB process is configured as a Multiple Independent Level of Security (MILS) CORBA ORB.

5. The system of claim 1 wherein the ORB process is configured as a Lightweight ORB.

6. The system of claim 1 wherein the operating system is one of a portable operating system interface (POSIX), minimal POSIX, or an Application Environment Profile (AEP) compliant kernel.

7. The system of claim 1 wherein the operating system is a Multiple Independent Level of Security (MILS) Partitioning Kernel.

8. The system of claim 1 wherein architecture of the system complies with Software Communications Architecture (SCA) specifications.

9. The system of claim 1 wherein architecture of the system complies with Object Management Group (OMG) SWRadio specifications.

10. The system of claim 1 wherein the subset of the RCA core framework supports functionality for at least one of an Application Factory, a Resource Factory, an Application, Resources, a Device, a Property Set, a Port, a Port Supplier, and a Testable Object.

11. The system of claim 10 wherein the subset of the RCA core framework further supports functionality for a Loadable Device.

12. The system of claim 11 wherein the subset of the RCA core framework further supports functionality for an Executable Device.

13. The system of claim 12 wherein the subset of the RCA core framework further supports functionality for an Aggregate Device.

14. The system of claim 1 further comprising a Device Manager process for managing devices supported by the subset of the RCA core framework.

15. The system of claim 1 wherein the Application Launcher process is further configured to accept, store, and start at least one RCA compliant waveform.

16. The system of claim 1 wherein the Application Launcher process is further configured to respond to requests from a host.

17. The system of claim 1 wherein the Application Launcher process is further configured to request at least one waveform from a host.

18. The system of claim 1 wherein on boot, the Application Launcher process is further configured to start a last known waveform.

19. The system of claim 1 wherein the ORB process is at least partially implemented using at least one of a Field Programmable Gate Array (FPGA), an Application-Specific Integrated Circuit (ASIC), a Digital Signal Processor (DSP), and a General Purpose Processing Unit (GPPU).

20. The system of claim 1 wherein the Application Launcher process is at least partially implemented using at least one of a Field Programmable Gate Array (FPGA), an Application-Specific Integrated Circuit (ASIC), a Digital Signal Processor (DSP), and a General Purpose Processing Unit (GPPU).

21. The system of claim 1 wherein the subset of the RCA core framework is at least partially implemented using at least one of a Field Programmable Gate Array (FPGA), an Application-Specific Integrated Circuit (ASIC), a Digital Signal Processor (DSP), and a General Purpose Processing Unit (GPPU).

22. The system of claim 1 wherein the system is implemented on a plug and play module adapted for coupling to a host via a plug and play bus.

23. The system of claim 22 wherein the plug and play module is one of a PCMCIA card or a USB module.

24. The system of claim 1 wherein the system is implemented in a cellular phone.

25. The system of claim 1 wherein the system is implemented in one or more Black radio cores.

26. The system of claim 25 wherein the system further includes a Red radio core in communication with the one or more Black radio cores through a security device.

27. The system of claim 26 wherein the Red radio core includes a full RCA core framework capable of supporting the one or more Black radio cores.

28. The system of claim 26 wherein the Red radio core is adapted to communicate with a host via a plug and play bus.

29. The system of claim 25 wherein the system further includes a host in communication with the one or more Black radio cores through a security device.

30. The system of claim 29 wherein the host includes a full RCA core framework capable of supporting the one or more Black radio cores.

31. The system of claim 1 wherein the system is implemented in one or more Red radio cores.

32. The system of claim 1 wherein the system is a slave to a remote or external host configured with a full RCA core framework capable of supporting the system.

33. The system of claim 32 wherein the remote or external host is capable of building and sending applications to the Application Launcher process.

34. A lightweight reconfigurable communications architecture (RCA) radio system, comprising:
   at least one processor for executing processes running on the system;
   a Multiple Independent Level of Security (MILS) CORBA Object Request Broker (ORB) process configured for enabling inter-process communication within the system;
   an Application Launcher process configured for at least one of requesting and accepting RCA compliant applications via the MILS CORBA ORB process;
   a MILS Partitioning Kernel configured to allow high security applications to operate in the system; and
   a subset of a RCA core framework configured to provide functionality that allows the compliant applications to operate.

35. The system of claim 34 wherein the system is a slave to a remote or external host configured with a full RCA core framework capable of supporting the system, and capable of building and sending applications and supporting information to the Application Launcher process.

36. The system of claim 34 wherein the system is implemented in one or more Black radio cores and further includes a security device that decrypts data received from the one or more Black radio cores.

37. The system of claim 36 wherein the system further includes a host in communication with the one or more Black radio cores through the security device.

38. The system of claim 37 wherein the host includes a full RCA core framework capable of supporting the one or more Black radio cores.

39. The system of claim 34 wherein the system is implemented in one or more Red radio cores.

40. The system of claim 34 wherein the MILS Partitioning Kernel is further configured for managing processes running on the system.

41. A lightweight reconfigurable communications architecture (RCA) radio system, comprising:
   at least one processor for executing processes running on the system;
   an Object Request Broker (ORB) process configured for enabling inter-process communication within the system;
   an Application Launcher process configured for at least one of requesting, accepting, and starting RCA compliant applications via the ORB process; and
   a subset of a RCA core framework configured to provide functionality that allows the compliant applications to operate.

42. The system of claim 41 wherein the system is implemented on a plug and play module adapted for coupling to a host via a plug and play bus.

43. The system of claim 41 wherein the system is implemented in a cellular phone.

44. The system of claim 41 wherein the system is implemented in one or more Black radio cores and further includes a security device that encrypts data leaving the one or more Black radio cores.

45. The system of claim 41 wherein the system is a slave to a remote or external host configured with a full RCA core framework capable of supporting the system, and capable of building and sending applications and supporting information to the Application Launcher process.

46. A communications system, comprising:
   a hardware device implementing an Object Request Broker (ORB) process, said ORB process being configured to enable communication of an ORB message between two application processes; and
   a processor that is responsive to the ORB message for executing an application that comprises at least one of the two application processes.

47. The system of claim 46, wherein the ORB process implemented on the hardware device is a full implementation of a CORBA ORB.

48. The system of claim 46, wherein the ORB process implemented on the hardware device is configured to provide a minimum functionality required for executing the application.

49. The system of claim 46, wherein the ORB process implemented on the hardware device is configured as a Multiple Independent Level of Security (MILS) CORBA ORB.

50. The system of claim 46, wherein the ORB process implemented on the hardware device is at least partially implemented on at least one Field Programmable Gate Array (FPGA).

51. The system of claim 46, wherein the hardware device comprises at least one Field Programmable Gate Array (FPGA).

52. The system of claim 46, wherein the hardware device is at least partially implemented using at least one of an Application-Specific Integrated Circuit (ASIC), a Digital Signal Processor (DSP), or a General Purpose Processing Unit (GPPU).

53. The system of claim 46, further comprising:
   an application launcher process configured for at least one of requesting, accepting, receiving, and starting the application via the ORB process implemented on the hardware device.

54. The system of claim 46, wherein the application is a standard compliant application within a standard framework.

55. The system of claim 54, wherein the standard framework is configured as a subset of a reconfigurable communications architecture (RCA) core framework.

56. The system of claim 46, wherein said ORB process implemented on the hardware device comprises marshalling functionality.

57. The system of claim 55, wherein said ORB process implemented on the hardware device used as part of at least one of a Software Defined Radio (SDR).

58. A communications system, comprising:
a processor that is responsive to messages communicated via one or more Object Request Broker (ORB) processes for executing an application; said one or more ORB processes comprising a marshalling functionality; and
a Field Programmable Gate Array (FPGA) that performs the marshalling functionality.

* * * * *